United States Patent

[11] 3,560,664

[72] Inventor Frederick A. Stich
Hales Corners, Wis.
[21] Appl. No. 797,161
[22] Filed Feb. 6, 1969
[45] Patented Feb. 2, 1971
[73] Assignee Automatic Electric Laboratories, Inc.
Northlake, Ill.
a corporation of Delaware

[54] APPARATUS FOR MONITORING A PLURALITY OF RELAYS
7 Claims, 3 Drawing Figs.

[52] U.S. Cl. ........................ 179/18
[51] Int. Cl. ........................ H04m 3/22
[50] Field of Search ........................ 179/18.6A, 18.6, 18.3A, 18.3, 18BT; 307/88

[56] References Cited
UNITED STATES PATENTS
3,073,907 1/1963 Alterman et al. ............ 179/18(.6A)

*Primary Examiner*—Kathleen H. Claffy
*Assistant Examiner*—Thomas W. Brown
*Attorneys*—Spencer E. Olson, K. Mullerheim and B. E. Franz

ABSTRACT: A circuit for monitoring the status of a plurality of relays includes a plurality of monitoring devices each having a control winding connected across a contact of a relay being monitored, and drive and sense windings connected to drive and detector circuits, respectively. The drive circuit includes a switching transistor which momentarily connects the drive windings of a plurality of devices to a current source permitting a current pulse to traverse the windings. If the contact being monitored is open the current pulse induces a voltage in the sense winding, but if the contact is closed the control winding is shunted out and only a noise pulse is induced in the sense winding, The switching transistor is controlled by a differential amplifier which compares a voltage fed back from the output of the switching transistor to a reference voltage, amplifies the difference, and regulates the base drive to the switching transistor to compensate for changes in the impedance of the monitoring devices and maintain the magnitude of the current pulse constant.

INVENTOR.
FREDERICK A. STICH
BY
AGENT

APPARATUS FOR MONITORING A PLURALITY OF RELAYS

FIELD OF THE INVENTION

This invention relates to monitoring apparatus and more particularly, to an arrangement for monitoring the status of a plurality of circuits.

BACKGROUND OF THE INVENTION

In the application of F. A. Risky, Ser. No. 667,791, filed Sept. 15, 1967, and assigned to the assignee of the present application, and in U.S. Pat. No. 3,138,720, there are described devices for monitoring a plurality of circuits in a common control-type telephone switching system which includes both electronic and electromechanical components. The monitoring device provide an interface between high speed electronic equipment and relatively slower electromechanical components.

Each monitoring device comprises an elongated stick of ferrite material, having a pair of apertures through which are threaded a drive loop and a sense loop. The element is positioned within a bobbin on which a pair of multiturn control windings are wound. The control windings are connected in the circuit being monitored and when a current pulse is applied to one of the loops, a pulse is induced in the other loop if the control windings are not energized. If the control windings are energized with sufficient current to saturate the ferromagnetic element, a pulse induced in the second loop will be of significantly lower magnitude than when the element is not saturated. Thus, the presence or absence at the sense winding of a signal of a predetermined amplitude is indicative of the status of the circuit being monitored.

In order to provide the required isolation, the monitoring (drive and sense) windings and the monitored (control windings — which, as mentioned above are connected in the circuit being monitored — are wound orthogonal to one another and magnetic saturation is used to effect a change in the output at the sense winding for a change in current flow in the control windings. To obtain this orthogonal relationship between these windings, an unusual magnetic element, embodied as an apertured stick of ferrite material, must be used. Moreover, the production of the monitoring device is complicated by the need to thread the drive and sense loops through apertures in the magnetic element.

It is accordingly an object of this invention to provide a circuit, including a simple magnetic sensing devices, for monitoring a plurality of circuits, and which does not require orthogonality between the monitoring and the control windings of the sensing devices to provide the monitoring function.

It is another object of the invention to provide a drive circuit for supplying a regulated current pulse to the drive windings of a plurality of serially connected sensing devices used in the monitoring circuit to minimize the differences in leading effect on the drive circuit depending on the state of the circuits to which the various sensing devices are individually connected.

SUMMARY OF THE INVENTION

Accordingly, the monitoring circuit of the invention uses a commercially available, linear pot core having coplanarly wound control, drive and sense windings, as the monitoring device. The control windings are connected across a pair of contacts of a relay which, in turn, has its coil connected serially in the circuit being monitored. Current in the circuit being monitored flows only in the windings of the relay coil. The control windings of the monitoring device and the contacts of the relay are connected in a dry circuit, that is, one in which no direct current flows, since the monitoring technique, according to this invention, does not require saturation of a magnetic element in response to current flow in the circuit being monitored. Since there is isolation between the monitoring circuit and the circuit being monitored, there is no coupling of noise from one circuit to the other. Therefore, the drive and the sense windings are wound coplanarly with the control winding. This makes for an overall arrangement which is simple and easy to manufacture and yet fully satisfactory in operation. The drive circuit includes a switching transistor which, when switched to the saturation state, connects the drive windings to a current source. The state of conduction of the switching transistor is controlled by a differential amplifier which has two input signals, one derived from a reference voltage and the other derived from a voltage fed back from the output of the switching transistor. The differential amplifier compares the two voltages and regulates the base drive to the switching transistor in accordance with the difference between these voltages. By virtue of its regulating feature, the drive circuit is readily adaptable not only to changes in the current supply but also to variations in the number of sensing elements connected to its output, and, moreover, is largely independent of the state of the circuits to which the control windings of these devices are connected.

The monitoring circuit is described in an embodiment for monitoring the status of relays in a telephone switching system. The input of the drive circuit is connected to a common control network, and, upon receipt of a signal from the control network, the switching transistor is turned on, permitting current to flow through the drive windings connected to the output of the drive circuit. A transformer, connected between the output of the switching transistor and the drive windings couples the output pulse to an input of the differential amplifier, and the amplifier compares this pulse with the signal from the control network, and regulates the magnitude of the current through the switching transistor in accordance with the difference between these signals. If a contact of a relay connected across a control winding of one of the monitoring devices is open, the current pulse applied to its drive winding produces an output pulse across the sense winding. On the other hand, if the contact is closed the control winding is shunted out and this short circuit is reflected to the sense winding, and only a small "noise" pulse appears across the sense winding. A detector circuit connected to the sense winding monitors the output of the winding.

DESCRIPTION OF THE PREFERRED EMBODIMENT OF THE INVENTION

Figure 1:
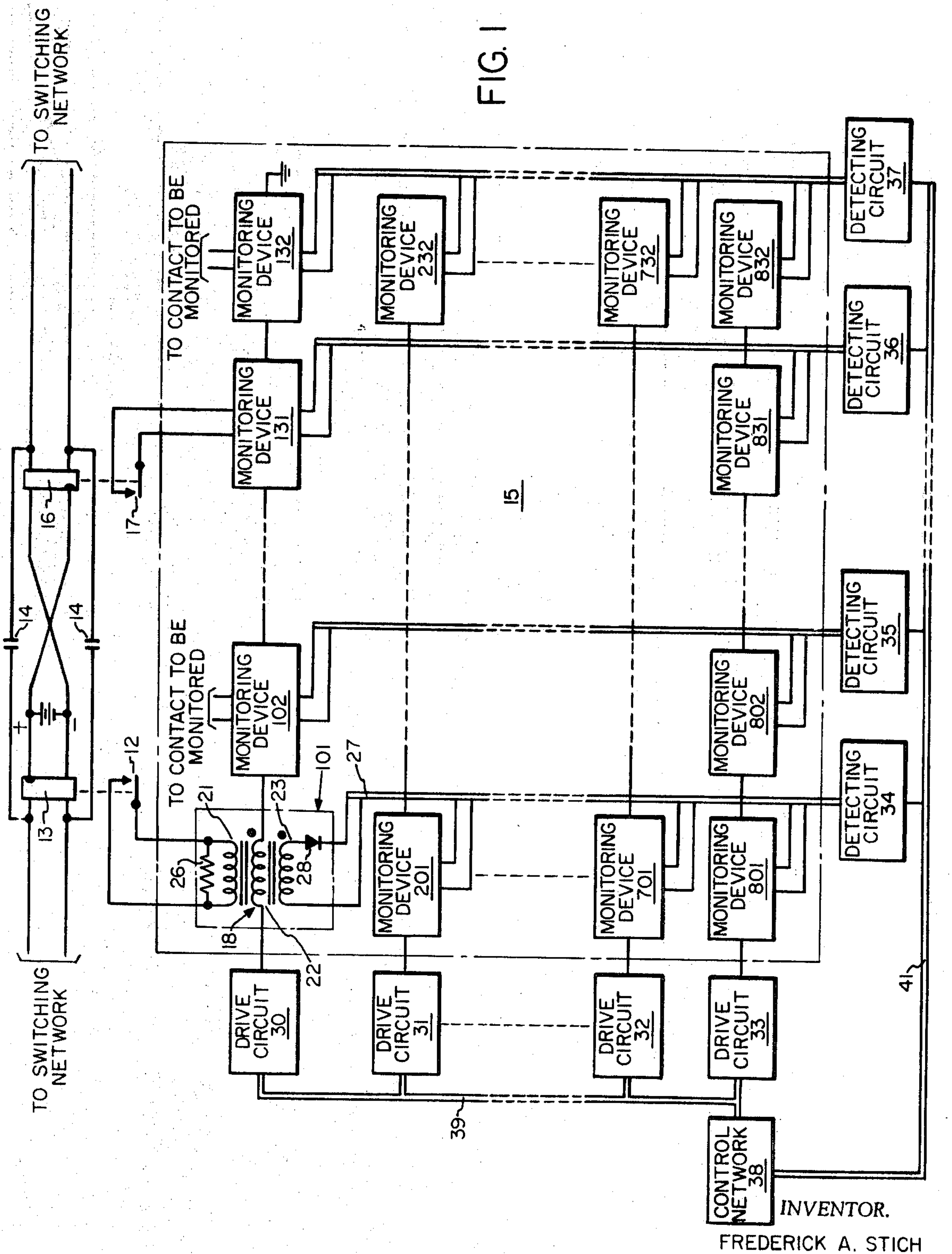
FIG. 1 is a block diagram of a matrix of devices and associated control circuitry according to the invention, for monitoring the status of a plurality of relays.

Referring to FIG. 1, a relay contact monitoring circuit is shown employed in a common control telephone switching system to supervise contacts 12 and 17 of relays 13 and 16, respectively, which form a "horseshoe" trunk circuit providing intraoffice connections between a pair of subscriber lines (not shown). The pair of subscriber lines, which are interconnected, are extended through a switching network (not shown) to relays 13 and 16, respectively. When the subscriber lines are interconnected via the trunk circuit, the supervisory function of relays connected to the lines (not shown) is transferred to the trunk relays 13 and 16. The trunk relays will provide an indication via their contacts 12 and 17, of the status of both of the subscriber lines. A shunt path around the coils of the relays is provided by a pair of capacitors 14. One of the trunk relays 13 is associated with monitoring device 101 and the other trunk relay 16 is associated with monitoring device 131.

Whenever relay 13 is operated, and consequently, contact 12 is closed, a short circuit will be effected across winding 21 of monitoring device 101 which is associated with relay 13. The condition of winding 21 is determined by supplying a current pulse to winding 22 of monitoring device 101 and sensing whether or not the current pulse is effectively coupled to winding 23 of the device.

To facilitate this interrogation of the monitoring devices, the devices are arranged in a matrix 15 having eight rows with 32 devices in each row. Only 12 devices are shown and they have been given reference characters which correspond to their position in the matrix. For instance, the device at row 1, column 1, has been given reference character 101; the device at row 8, column 32 has been given reference character 832. The number and the disposition of devices in the matrix is given by way of example only.

Figures 2, 3:
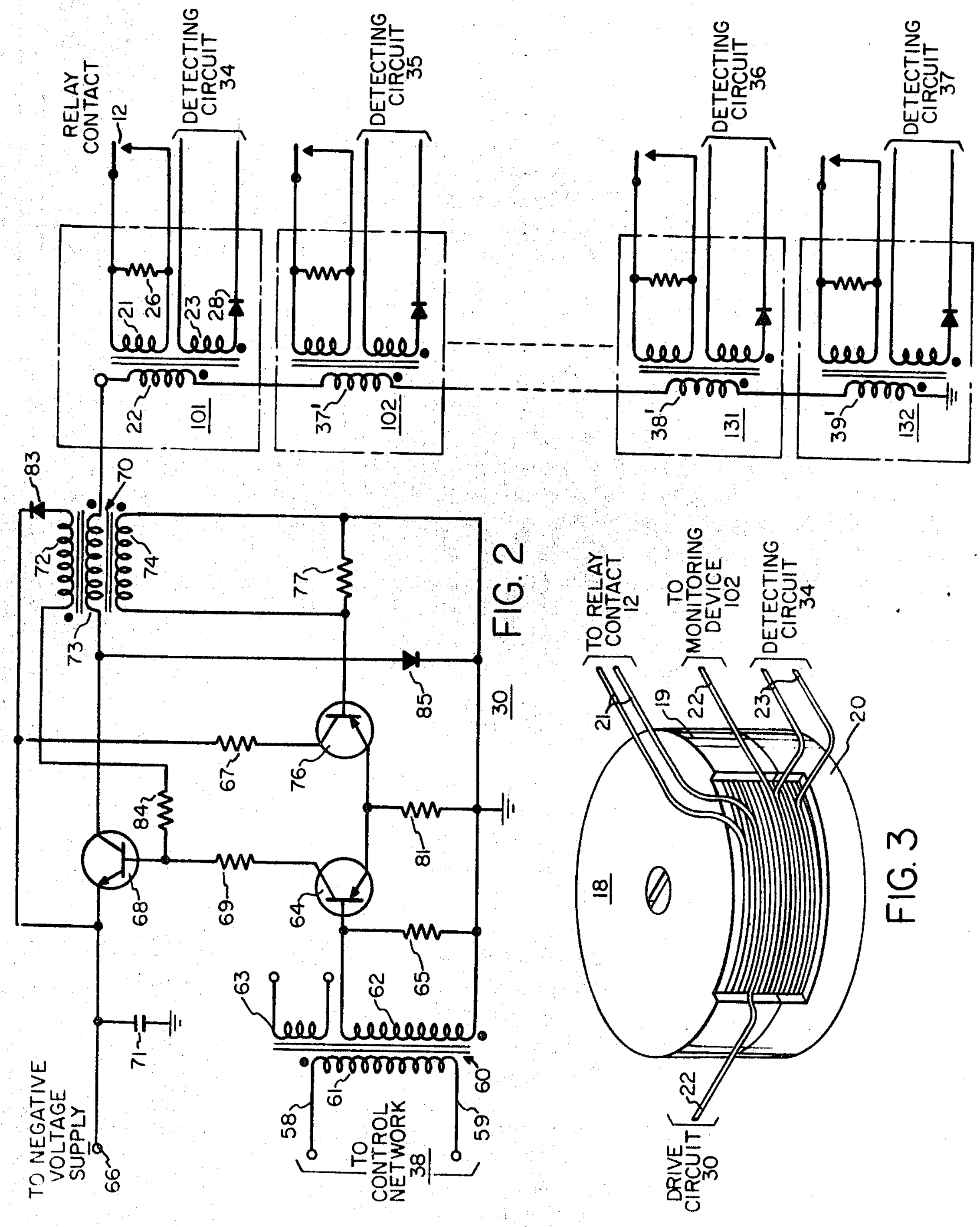
FIG. 2 is a schematic circuit diagram of a drive circuit according to the invention, for supplying a current pulse to a plurality of contact monitoring devices.
FIG. 3 is a perspective view of a monitoring device in accordance with the principles of the invention.

Each monitoring device includes a pot core transformer having three windings, and associated terminating resistances. The electrical schematic of device 101 is shown in FIG. 2, and the pot core transformer 18, is separately shown in a perspective view in FIG. 3. A pot core suitable for this purpose is core 1107A100–D3 manufactured by Ferroxcube Corp.

The transformer 18 has a control winding 21 connectable across a pair of contacts 12 of a relay 13, a drive winding 22 connected to a drive circuit 30 and a sense winding 23 connected to a suitable pulse detecting circuit 34. The control and the sense windings each comprise 50 turns of 034 wire and these windings are bifilarly wound on the bobbin of the pot core. The drive winding comprises 10 turns of 023 wire and is wound over the other windings. The control, drive and sense windings are all wound coplanar with one another.

The device 101 further includes a resistor 26 connected in parallel across winding 21. A diode 28 is connected between winding 23 and cable 27 to permit the winding to be "OR"ed with the sense windings of other devices in the same column for connection to detector circuit 34.

The matrix is accessed by eight drive circuits, only four of which are shown and given consecutive reference numerals 30—33, connected to each row, and 32 detector circuits, only four of which are shown and given consecutive reference numbers 34—37, connected to each column. The drive and detector circuits are controlled by a control network 38.

Referring to FIG. 2, the drive circuit 30 includes an input transformer 60, which is similar to the monitoring devices used in the matrix, includes a first winding 61 having terminals 58 and 59 connected to the output of the common control network 38 via cable 39 and a second winding 62 connected between the base of a transistor 64 and ground. The windings are oppositely poled so that an input pulse applied to winding 61 will be of opposite polarity to the pulse induced in winding 62. The third winding 63 is unused. A resistor 65 is connected between the base of transistor 64 and ground, in parallel with winding 62. The collector of transistor 64 is connected to the base of transistor 68, the switching element, through resistor 69. Transistor 68 operates in the switching mode and is normally in the cutoff state. The emitter of transistor 68 is connected to a negative supply 66. A capacitor 71 is connected between the voltage supply and ground.

The collector of transistor 68 is connected to ground through the drive winding 73 of an output transformer 70 and the drive windings of the 32 monitoring devices in the first row of the matrix. Transformer 70 is also a three winding pot core transformer and is similar to the transformers which form the matrix 15. A second winding 74 of transformer 70 is connected between the base of transistor 76 and ground, and a resistor 77 is connected in parallel with winding 74. Transistors 64 and 76, which are biased in the active region, are connected as a differential amplifier and operate as a control circuit to regulate base current to the transistor 68. The emitter of transistor 76 is connected directly to the emitter of transistor 64 and the emitters are connected to ground through a common resistor 81.

A third winding 72 of transformer 70 has one terminal connected to the emitter of transistor 68 through a diode 83 and its other terminal connected to the base of transistor 68 through resistor 84. Winding 72 is oppositely poled with respect to to winding 73. A diode 85 is connected between the collector of transistor 68 and ground.

Referring again to FIG. 1, sense winding 23 of device 101, is "OR"ed together with the other sense windings in the first column in the matrix and is connected to a detector circuit 34. The detector circuit 34 may be any conventional voltage pulse detecting circuit known in the art capable of detecting a voltage pulse of approximately 1 to 3 volts in amplitude and one-half to 2 μsecs in duration. In view of the magnitude of the output pulse available, a transformer will suffice. 32 such circuits are shown by way of example, each having its input connected to the sense windings of the eight monitoring devices in a particular column of the matrix.

The outputs of the detector circuits are connected to a cable 41 which passes the sensed signals to the control network 38 where the information received from the matrix in the form of the sensed voltages is interpreted to determine the status of the relays being monitored. The manner in which the monitoring circuit operates will be described by way of an example in which it is assumed the status of relay 13 is to be determined.

The matrix of monitoring devices is interrogated a row at a time by one of eight drive circuits. The row to be interrogated and the order of interrogation is determined by the common control network 38 and a signal, generated by the control network, is sent along cable 39 to the drive circuit selected. It is pointed out, however, that the contact monitoring circuit may be used in other applications and that in such applications only one drive circuit may be required. Accordingly, the drive circuit would include a separate timing circuit, connected between terminals 58 and 59 of the drive circuit, to generate pulses to permit periodic energization of the switching element.

In the present example, to determine the status of relay 13 the signal, generated by the control network, is passed via cable 39 to winding 61 of input transformer 60 of drive circuit 30. Transformer 60 provides isolation between the electronic logic circuits in the control network 38 and the circuits connected to the negative voltage source 66. Since windings 61, 62 of the input transformer are of reverse polarity, the input pulse, which is positive, will cause a negative voltage pulse having a pulse width of approximately 1 μsec, to be established across resistor 65 between the base of transistor 64 and ground.

This voltage pulse, used as a reference voltage, causes collector current from transistor 64 to flow to the base of transistor 68, and transistor 68 turns on. Since the input pulse is inductively coupled, the voltage which appears across resistor 65 is independent of the duration of the input pulse, and the switching element 68 will not be maintained in the "ON" condition long enough to be damaged as a result of excessive current flow through its emitter-collector circuit.

When transistor 68 is turned on, for about 1 μsec, a current pulse, approximately 300 ma. in magnitude, is generated. This pulse traverses a path from ground to the source 66, through the drive windings of the devices in the first row of the matrix, winding 73 of transformer 70 and the emitter-collector circuit of transistor 68.

Each drive circuit has its output connected to 32 monitoring devices through the drive winding of an output transformer. If the relays monitored by these devices are not operated, the circuit drives 33 windings. However, when all the relays are operated, 32 of the windings are effectively shorted by closed relay contacts which shunt out the control windings of these devices.

Changes in the loading of the drive circuit, as more or fewer relays are operated, are compensated for by comparing, for example in the case of drive circuit 30, the voltage appearing across resistor 65 with the pulse fed back from the output and appearing across resistor 77. If the feedback voltage pulse is equal to the reference voltage the difference between the voltages detected by the differential amplifier is zero and no compensation is needed. If, however, there is difference, the collector of transistor 64 reflects this difference to provide the base drive to transistor 68 required to adjust the output current to adapt to the change in the load.

For example, if the current pulse from transistor 68 is larger than desired, the feedback pulse coupled back to the base of transistor 76 via winding 74 of transformer 70 and appearing at the base of transistor 76 will be larger than the reference voltage present at the base of transistor 64. Therefore, transistor 76 will be driven harder, requiring more current in its base-emitter circuit. Since the emitters of both transistors 64 and 76 are connected together, current will be diverted away from transistor 64 to satisfy the needs of transistor 76. This will cause a corresponding decrease in the collector current of transistor 64 whereby the base current to transistor 68 will be decreased and the output current will also be decreased. The circuit will stabilize when the voltage fed back is equal to the reference voltage at the input. This stabilizing feature permits the use of a simple device, namely, a pot core transformer, as the sensing element. Although changes in the load at the output of the drive circuit will occur as more or fewer control windings become shunted out, these impedance transformations, while reflected back to the drive circuit will be compensated for by the drive circuit.

As the current pulse traverses the drive winding 22 of monitoring device 101, a pulse approximately 3 volts in magnitude will be produced across sense winding 23 whenever the supervised contact 12 connected to the control winding 21, is open. If, on the other hand, the contact 12, is closed, the short circuit across the control winding is coupled to the other windings, and only a small "noise" pulse of approximately 1 volt will appear across the winding. In either case, the output pulse is detected by detector circuit 34 and passed to the control network 38 via cable 41, and if the contact is closed, the control network will interpret the decreased magnitude of the pulse as an indication that relay 13 has been operated.

When the reference voltage appearing at the input to transistor 64 goes to zero, the base drive supplied to transistor 68 is no longer sufficient to maintain this transistor on and transistor 68 begins to turn off. However, transistor 68 is a power transistor since it is required to carry large currents. Consequently, it is slow to turn off because of excessive stored base charge. Therefore, a degenerative turnoff arrangement is used to help speed up the turnoff of the transistor. When transistor 64 is no longer supplying base current to transistor 68, the latter begins to turn off and causes a reverse voltage in winding 73 of transformer 70. This voltage is coupled to the winding 72 of transformer 70, forward biasing diode 83 and reverse biasing and base-emitter junction of transistor 68 through diode 83 and resistor 84. The reverse bias on the base-emitter junction of 68 causes transistor 68 to turn off more, and the degenerative effects continue until the stored base charge has been removed from transistor 68 and the transistor is in the cutoff state.

The diode 85 provides a discharge path for the drive windings of the devices in a given row after the current path through transistor 68 is opened.

The remaining rows in the matrix are interrogated in a similar manner under the control of the common control network and the status of the relays being monitored is determined on a cyclical basis.

While the relay contact monitoring arrangement has been described with reference to an embodiment in a common control telephone system to monitor the status of trunk circuits, it should be apparent that the contacts of other supervisory relays in any switching system could be monitored by this arrangement.

From the foregoing, it is apparent that there has been provided a simple arrangement for monitoring a plurality of circuits. In accordance with the principles of the invention, the simple magnetic sensing device which is employed provides isolation between the circuit being monitored and the monitoring equipment without the need to provide orthogonal windings for the device. Accordingly, a commercially available magnetic pot core is used for the device and its associated windings are coplanarly wound on a bobbin. Thus, the device is easy to manufacture and is inexpensive.

Moreover, the regulating feature of the drive circuit portion of the monitoring arrangement provided by this invention complements the performance of this simple pot core sensing device by rendering the drive circuit largely independent of the state of the circuits to which the monitoring devices are connected. In addition, the drive circuit is adaptable to changes in the current supply and to variations in the number of sensing devices connected to its output. Therefore, the overall arrangement is simple and easy to manufacture and yet is fully satisfactory in operation.

I claim:

1. An electrical circuit for monitoring the status of pairs of contacts of a plurality of relays; said circuit comprising:

a plurality of transformers each individually associated with one of said contact pairs and each having a core of linear magnetic material, and a control, a drive and a sense winding coplanarly wound on said core;

each said control winding being connectable across one of said contact pairs and said control winding being shunted out by said contact pair whenever said contacts are closed;

the drive windings of said transformers being connected together in series;

a drive circuit connected to said drive windings for periodically supplying a current pulse to said drive windings, said pulse being effective to produce a voltage across the sense winding of each of said transformers, said voltage being of a first magnitude when the contacts connected across the control winding are open and of a second magnitude when the contacts connected across the control winding are closed; and means connected to said sense windings for sensing the voltages appearing across said sense windings.

2. An electrical monitoring circuit as claimed in claim 1, wherein said drive circuit includes electronic switching means having a control electrode, and having a pair of output electrodes connected in series with a source of current and the series combination of said drive windings;

control means having first and second input circuits and having an output circuit connected to said control electrode;

means connected to said first input circuit for establishing a reference voltage at said first input circuit;

means interposed between one of said output electrodes of said electronic switching means and said second input circuit for establishing a feedback voltage, proportional to the current in said drive windings, at said second input circuit;

said control means being responsive to said first voltage to render said switching means conductive and supply a current pulse to said drive windings, and to compare said reference and said feedback voltages and control the current through said switching means in accordance with the difference of said voltages.

3. An electrical circuit as claimed in claim 2, wherein said means for establishing said feedback voltage includes an output transformer having a first winding connected between said one output electrode of said switching means and said drive windings, and a second winding connected to said second input circuit of said control means, whereby said current pulse, when supplied to said drive windings traverses said first winding, inducing said feedback voltage in said second winding.

4. An electrical circuit as claimed in claim 3, wherein said control means includes first and second transistors connected as a differential amplifier, each of said transistors having a control electrode and a pair of output electrodes, an output electrode of the first transistor being connected to the control electrode of said switching means.

5. An electrical circuit as claimed in claim 4, wherein said electronic switching means comprises a power transistor characterized by a long turnoff time, relative to the turnoff time of the first transistor, and wherein said output transformer further includes a third winding connected between the control electrode and the other output electrode of said electronic switching means to decrease the time required to turn off said power transistor.

6. In a common control telephone system including a common control network and a plurality of circuits each having a relay for indicating, via a pair of contacts, the status of the particular circuit with which said relay is associated; a circuit for monitoring the status of the contacts of said relays; said monitoring circuit comprising:

a plurality of monitoring devices arranged in rows and columns to form a matrix, each device having magnetically coupled drive, sense and control windings, the drive windings in each row being serially connected together, and the control windings being individually connected across a pair of said contacts and each said control winding being shunted out by a respective pair of contacts whenever said contacts are closed;

a plurality of drive circuits cyclically activated by said common control network and each connected between said network and a corresponding row of said monitoring devices, each of said drive circuits including electronic switching means having a control electrode, and having a pair of output electrodes connected in series with a source of current and the drive windings of the devices in said row for supplying a current pulse to the drive windings in said row, the magnitude of said current pulse being regulated by said drive circuit in accordance with the number of control windings that are shunted out by respective contacts;

said current pulse being effective to produce a voltage across the sense windings of the monitoring devices in said row, with the voltage being of a first magnitude when the associated control winding is not shunted out and of a second magnitude when the associated control winding is shunted out; and means connected between the sense windings of said monitoring devices and said common control network for sensing the voltage appearing across said sense windings.

7. A monitoring circuit in a common control telephone system as claimed in claim 6, wherein:

said drive circuit further includes control means having first and second input circuits, and having an output circuit connected to the control electrode of said switching means;

and an input transformer having a first winding connected to said common control network and a second winding connected to said first input circuit of said control means;

whereby a signal from said common control received at said input transformer establishes a reference voltage at said first input circuit of said control means, energizing said control means to render said switching means conductive to supply said current pulse to the drive windings of said row, and means interposed between said switching means and the drive windings of said row for establishing at said second input circuit of said control means a feedback voltage, proportional to the current traversing said drive windings; and said control means comparing said reference and said feedback voltages and controlling the current through said switching means in accordance with the difference of said voltages.